(12) United States Patent
Tallos et al.

(10) Patent No.: US 10,914,393 B2
(45) Date of Patent: Feb. 9, 2021

(54) MULTISTAGE AUTOMATED THERMAL BALANCING VALVE

(71) Applicants: Nicholas Tallos, Merion Station, PA (US); Glenn Quinty, Chalfont, PA (US); William C Reilly, Langhorne, PA (US)

(72) Inventors: Nicholas Tallos, Merion Station, PA (US); Glenn Quinty, Chalfont, PA (US); William C Reilly, Langhorne, PA (US)

(*) Notice: Subject to any disclaimer, the term of this patent is extended or adjusted under 35 U.S.C. 154(b) by 279 days.

(21) Appl. No.: 15/787,446

(22) Filed: Oct. 18, 2017

(65) Prior Publication Data

US 2018/0038502 A1 Feb. 8, 2018

Related U.S. Application Data

(63) Continuation-in-part of application No. 13/769,597, filed on Feb. 18, 2013, now Pat. No. 9,879,796.

(51) Int. Cl.
| | |
|---|---|
| *F16K 31/00* | (2006.01) |
| *E03B 7/04* | (2006.01) |
| *F24D 17/00* | (2006.01) |
| *F16K 17/30* | (2006.01) |
| *G05D 23/13* | (2006.01) |
| *G05D 23/02* | (2006.01) |

(52) U.S. Cl.
CPC ............. *F16K 31/002* (2013.01); *E03B 7/04* (2013.01); *F16K 17/30* (2013.01); *F24D 17/0078* (2013.01); *G05D 23/02* (2013.01); *G05D 23/022* (2013.01); *G05D 23/1333* (2013.01); *G05D 23/1313* (2013.01); *Y10T 137/0324* (2015.04); *Y10T 137/7737* (2015.04)

(58) Field of Classification Search
CPC ..... F16K 31/002; F16K 17/30; G05D 23/022; G05D 23/02; G05D 23/1333; G05D 23/1313; F24D 17/0078
See application file for complete search history.

(56) References Cited

U.S. PATENT DOCUMENTS

| | | | | |
|---|---|---|---|---|
| 4,180,208 A | * | 12/1979 | Obermaier | ........... G05D 23/022 236/100 |
| 6,029,686 A | * | 2/2000 | Pirkle | ................... F16K 31/002 137/315.25 |
| 6,138,705 A | | 10/2000 | Chen | |

(Continued)

OTHER PUBLICATIONS

These references were cited in the International Search Report for PCT/US18/56185 dated Dec. 18, 2018.

*Primary Examiner* — Larry L Furdge
(74) *Attorney, Agent, or Firm* — Cusick IP, PLLC; Clinton J. Cusick, Esq.

(57) ABSTRACT

A multistage automated thermally actuated valve utilizing a thermally expansive substance to substantially close the valve at a first temperature and a spring to open the valve at a second, lower temperature. A multistage automated valve comprising a first thermal assembly to balance fluid flow at a first temperature and a second thermal assembly to balance fluid flow at a second temperature in order to balance fluid flow in a system operated at a first temperature as well as at a second temperature. A method of utilizing an automated thermally actuated valve to balance and manage hot water supply in a piping system.

15 Claims, 8 Drawing Sheets

(56) References Cited

U.S. PATENT DOCUMENTS

| | | |
|---|---|---|
| 6,536,464 B1 | 3/2003 | Lum |
| 7,246,635 B2 | 7/2007 | Caleffi |
| 7,617,989 B2 | 11/2009 | Caleffi |
| 7,971,601 B2 | 7/2011 | Lum |
| 2004/0016816 A1 | 1/2004 | Gintner |
| 2005/0242199 A1 | 11/2005 | Kempf |
| 2006/0157575 A1 | 7/2006 | Lockhart |
| 2007/0290058 A1 | 12/2007 | Guterman |
| 2010/0032594 A1* | 2/2010 | Lamb ............ F16K 31/002 251/11 |
| 2011/0180741 A1 | 7/2011 | Lockhart |
| 2014/0230907 A1 | 8/2014 | Tallos et al. |
| 2017/0220056 A1 | 8/2017 | Grumer et al. |

\* cited by examiner

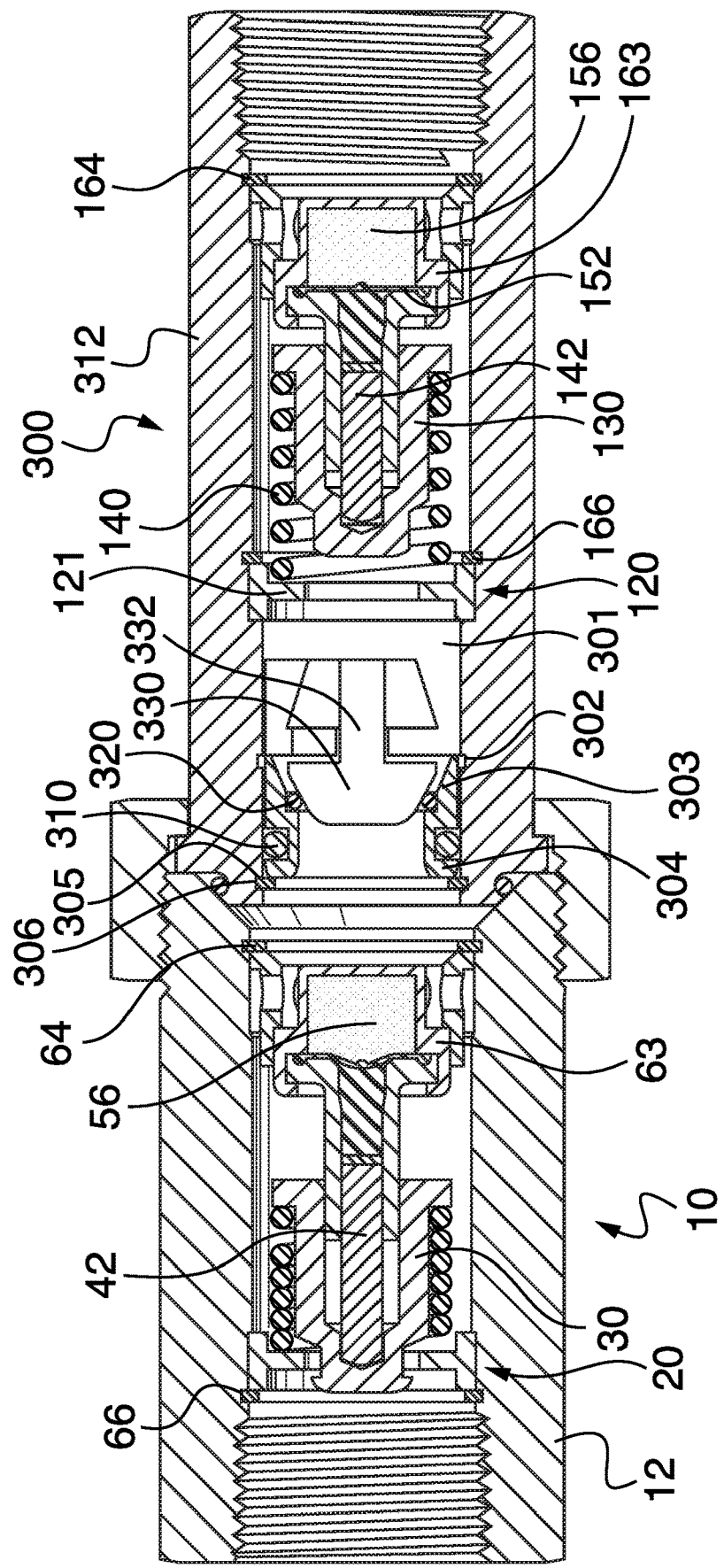

MULTISTAGE AUTOMATED THERMAL BALANCING VALVE

CROSS-REFERENCE TO RELATED APPLICATION

This application is a continuation-in-part of co-pending nonprovisional application Ser. No. 13/769,597 filed on Feb. 18, 2013. Application Ser. No. 13/769,597 is incorporated by reference in its entirety.

BACKGROUND OF THE INVENTION

Field of the Invention

The present general inventive concept is directed to a device that provides automated regulation of hot water systems, provides for additional automated regulation of flow rates to accommodate elevated temperatures, and a method of utilizing the device to improve performance in hot water systems.

Description of the Related Art

The prior art includes spring loaded valves utilizing thermal expansion of a solid, liquid, or phase change to effect opening or closure of a valve. Recent awareness of the development of bacteria in water systems has increased the need for sanitary flush operations in water systems. For example, Legionella can live in a hot water system, and can be sanitized by exposure to water at or above 140 degrees F. for more than thirty minutes. Government authorities recommend exposure to temperatures between 158 and 176 degrees Fahrenheit for twenty minutes. Previous methods to balance hot water systems require modification to accommodate a sanitary flush.

Conventional hot water balancing systems and shutoff valves have centered on the timely delivery of hot water without wasting water while waiting for hot water to arrive to a user, or avoiding excessive energy usage by recirculation pumps, or avoiding scalding a user by limiting the exposure to water above a safe temperature. While conventional efforts have provided apparatus and methods to circulate and deliver hot water around 100 degrees F. to 120 degrees F., the need for a sanitary flush requires apparatus and methods that accommodate temperatures above 150 degrees F. Copending application Ser. No. 13/769,597 discloses an automated valve that responds to the temperature of fluid flowing through the valve to expand a thermal actuator and reduce flow through the valve. The automated valve can be installed in piping runs and reduce the flow through piping runs that have sufficiently high temperatures, thereby ensuring flow through other available piping runs that are not sufficiently high to meet a designed or prescribed temperature. Complex piping systems can be balanced with automated valves of the present invention.

Valves have been disclosed that react to flow conditions to modify pump rates or feedback control. These approaches require adjustment by a skilled operator to adjust water balancing inputs. The system settings that are sufficient for ordinary operation need to be modified to accommodate sanitary flush operations, requiring additional technical personnel to conduct a sanitary flush.

Within hot water systems such as showers and sinks, it is known to utilize a valve to direct water flow. It is a common problem that the distance between the hot water heater or hot water source and the location where the user wishes to utilize the hot water causes a delay related to the pipe volume between the source and the user divided by the flow rate. In larger structures or larger diameter pipes, the delay can be substantial. Constant recirculation of hot water within the piping system is commonly utilized to reduce the delay in the delivery of hot water. However, in addition to the delay caused by distance and pipe volume, complex systems can experience resistance to the flow of hot water including gravity. A single hot water source within a system containing many faucets or outlets may not deliver hot water to all parts of the system equally, or sufficiently, to meet demand. Typical installations include the use of a pump, mixing valves, and other manual adjustments to attain delivery to all parts of a piping system in the face of gravity, flow restrictions, and other complicating factors either fixed or dynamic.

Numerous attempts to optimize the delivery of hot water in complex systems have been made. Recirculated water will travel the path of least resistance such that in multistory buildings, the top floors will not receive sufficient recirculation flow. What is needed is an automated valve that can be installed in-line with existing piping systems that requires no maintenance or adjustment, and can automatically adjust the recirculation flow to ensure the availability of hot water in complex piping systems. Further, a multistage automated valve is needed to accommodate sanitary flush operations ensuring complete sanitation. Sanitary flush operations in buildings need to overcome gravity, distance, and other obstacles to ensure sanitation of all parts of a piping system. A multistage valve is needed to both balance normal hot water flows and balance sanitary flush operations at elevated temperatures.

Other attempts to address this problem have been insufficient. For instance U.S. Pat. No. 7,681,804 to Lockhart discloses a temperature-controlled valve that can be inserted above a shower head. This valve does not obviate the delay in the arrival of the hot water supply. It merely reduces the waste of hot water that would be caused by an inattentive user that is not present at the moment hot water supply arrives. The disclosed valve does not automatically open when cooled. Further, the valve of Lockhart closes entirely to flow at sanitation temperatures above the normal operating temperature range. Numerous other valves have been manufactured and some have been patented, but most require adjustment or settings that make them unsuitable for installation in a piping system behind walls or access panels. What is needed is a valve that provides automated balancing of recirculation water flow to ensure that hot water is available soon after requested by a user. Further, it is desired to provide automated balancing of hot water flows at normal operation temperatures and to provide automated balancing of sanitary flush operations at elevated fluid flow temperatures to ensure that all sections of the piping system reach the designated sanitizing temperature.

SUMMARY OF THE INVENTION

It is an aspect of the present invention to provide a multistage balancing valve that automatically adjusts the flow of a fluid to manage the fluid flow within a piping system based on the temperature of the fluid by thermal expansion to move a piston casing into a seat opening at a first set point temperature, to move the piston casing further into the seat opening at a second set point temperature, and to provide a return force when the fluid temperature is both below the second set point temperature, and below the first set point temperature. It is a further aspect of the invention to provide a method of using an automated valve to balance fluid flow based on fluid temperature.

It is a further aspect of the present invention to provide an automated balancing valve that automatically adjusts the flow of recirculated hot water within a piping system to ensure that hot water is present throughout the hot water piping system; the multistage valve provides an additional regulation at elevated temperatures to provide additional balancing by utilizing a first and second thermal assembly to provide temperature responsive movement during sanitary flush operations.

These together with other aspects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

Further features and advantages of the present invention, as well as the structure and operation of various embodiments of the present invention, will become apparent and more readily appreciated from the following description of the embodiments, taken in conjunction with the accompanying drawings of which:

FIG. 9 is a cross section of an automated valve comprising a check valve, according to an embodiment.

DETAILED DESCRIPTION

Figure 1:
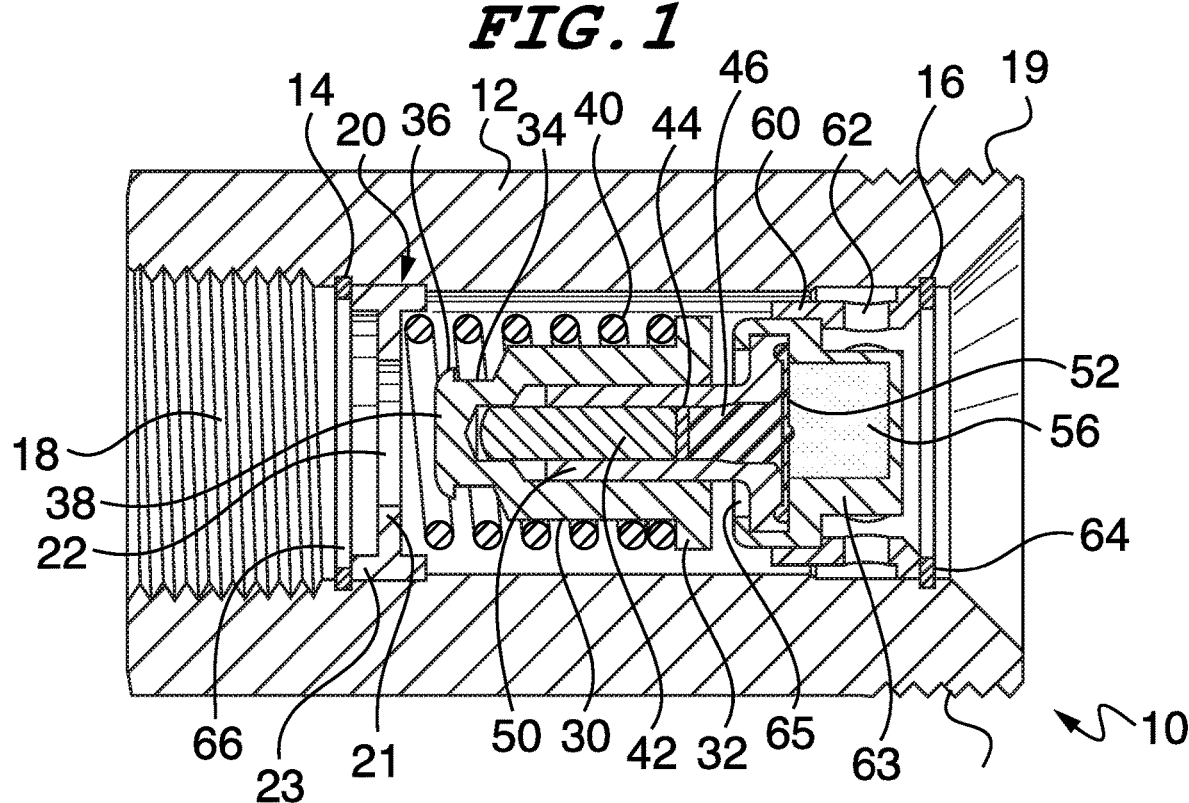
FIG. 1 is a cross section of an automated valve in a compressed configuration, according to an embodiment.

Reference will now be made in detail to the presently preferred embodiments of the invention, examples of which are illustrated in the accompanying drawings, wherein like reference numerals refer to like elements throughout.

The present inventive concept relates to an automated valve that provides automated flow regulation based on fluid temperatures. A valve that is preset to operate at designed temperatures can be installed without specific expertise in thermal valves, thereby reducing installation cost. The valve should operate automatically to increase or decrease flow to ensure proper management of fluid flow. Additionally, the valve should be made with a minimum number of components to reduce cost. Further, the valve should allow at least some flow at all temperatures so that sanitation operations such as high temperature flush or chemical flush of piping systems is not thwarted. The valve should also provide consistent performance over time and not degrade when contacted with hot water, chlorinated water, or other fluids. The above aspects can be obtained by a casing containing a spring biased piston driven by a cup filled with a thermally expansive substance that drives the piston towards a closed position when it is heated to a selected temperature or set point. The piston is surrounded by a piston casing configured to substantially obstruct a seat opening in the valve to reduce flow. When the thermally expansive substance is cooled, the spring provides a return force and pushes the piston casing and piston away from the seat opening to open the valve to flow. While the automated valve of the invention can be utilized with any number of fluids, such as ethylene glycol, hydraulic oils, poly alpha olefin, or fuel oils, discussion of the valve as used within hot water systems will be utilized for clarity of explanation and as water is the most commonly used fluid.

The automated valve will open to allow flow of hot water in a piping system when the assembly is cooled, ensuring the additional flow of water in that part of the piping system. When the flow of water is sufficiently warm, the piston and piston casing are driven towards the closed position, substantially reducing the flow of water within that portion of the piping system. The automated valve ensures that flow is substantial when the temperature is below a set point in order to enable the movement of hot water in the recirculation system. When the hot water is present, the valve automatically reduces flow to a small amount so that unnecessary recirculation of hot water in that portion of the piping system is avoided. The recirculation pump of the system will need to pump less water as the warm parts of the system will automatically establish reduced recirculation flow. The valve does not completely close to ensure continuous thermal communication with the system and to provide other safety features including access of all parts of the piping system to hot water sanitary flush or chemical flush to ensure sanitary conditions. The present inventive concept provides a multistage automated valve that provides additional functions at higher temperatures. The piston casing end can be shaped to provide a radial extension that interacts with a seat opening. The dimensions of the radial extension, the width of the seat opening, and the movement of the thermal assembly can be combined to program the automated valve to perform different functions at different temperatures. In one particular embodiment, the radial extension can be configured to move beyond the flow restriction of the seat opening to provide a third stage where flow through the automated valve is increased at higher temperatures. A thermal assembly can be combined with a second thermal assembly to provide additional functions at different temperatures. The automated valve can automatically open and allow water (or other liquid) flow when the liquid is below a certain temperature, and the automated valve can automatically close and block water (or other liquid) when the liquid is above a certain temperature. Further, the utilization of a radial extension can provide additional desirable flow characteristics responsive to temperature.

In one embodiment, a series of automated valves can be utilized in a piping system to optimally and automatically distribute water in order to provide showers, faucets, and other receiving elements with immediate hot water. The automated valve can be placed at the end of a piping run in a building for instance having a piping run on each floor. In a basic system, all of the piping runs return to a single recirculation pump. The valve can be installed into the piping at the end of each run before it joins the common return pipe. In this way, flow can be restricted by the valve in piping runs that are satisfactorily hot, thereby ensuring that flow is distributed to the runs in which the valve is open. A valve experiencing cool fluid flow or flow below a desired set point would be in an open position, allowing additional flow through that section of the system or that piping run. A set of valves can automatically balance fluid flow in a system subject to dynamic changes in demand and usage. Multistage valves can be used to further provide fluid balancing during sanitary flush operations. A valve can be installed in each piping run where the piston casing end comprises a radial extension that cooperates with a seat opening of desired depth to allow the radial extension to move past the seat opening at higher temperatures corresponding to a sanitary flush and provide a flow rate greater than communication flow, through the valve, for sanitizing operations. This third stage of opening to sanitary flush temperatures can be combined with a second thermal assembly that expands at a second target temperature to provide a high temperature balancing function at a fourth stage configuration.

A multistage automated valve is shown in cross section in FIG. 1. An embodiment of the invention is shown with automated valve 10 comprising a casing body 12. Casing 12 can be threaded with a combination of interior threads 18 and exterior threads 19 as needed for the particular application. The casing 12 is preferably constructed of metal, more preferably 303 stainless steel as it is machineable and it does not contain lead. The casing 12 is cylindrical and substantially hollow. First retaining groove 16 is configured to receive first retaining ring 64. Second retaining groove 14 is configured to receive second retaining ring 66. Seat 20 is positioned adjacent second retaining ring 66 and comprises seat base 20, seat interface 21, and seat opening 22. Seat base 20 maintains the position of the seat 20 and abuts retaining ring 66. Casing 12 interior can be shaped to provide additional retention of seat 20. Seat interface 21 receives spring 40 and serves to obstruct flow through the automated valve 10. Seat interface 21 has a seat interface width, not numbered, that cooperates with piston casing 30 to effect multistage fluid balancing.

Cup 63 contains thermally expansive substance 56 and is centered by carrier 60. Carrier 60 comprises carrier holes such as carrier hole 62 to allow flow through carrier 60. Diaphragm 52 covers the thermally expansive substance 56 in cup 63 and is maintained in position by guide 50. Guide 50 can be threaded on the exterior or smooth. Seat opening 22 is unobstructed at low temperatures, allowing fluid to flow through the automated valve 10 and casing body 12. The automated valve 10 of FIG. 1 is shown in a compressed configuration. Upon heating, the thermally expansive substance 56 expands to move diaphragm 52 outward and pushes plug 46 further into threaded guide 50. Plug 46 is deformable and abuts antiextrusion disk 44 positioned next to piston 42. Movement of piston 42 causes piston casing 30 to move towards seat opening 22 and overcome the force of spring 40 which biases the piston casing 30 away from seat opening 22. Spring 40 is positioned between seat interface 21 and piston casing collar 32. In an embodiment, a thermal assembly can comprise a cup 63, thermally expansive substance 56, diaphragm 52, plug 46, antiextrusion disk 44, piston 42, and guide 50. The thermal assembly comprises one embodiment of expansion means to change the position of piston casing 30 and change the configuration of automated valve 10. Expansion means can also comprise the diaphragm 52 and piston 30 in a simplified embodiment that causes the piston 30 to move in reaction to temperature changes of thermally expansive substance 56. Spring 40 provides a return force, and other mechanisms can be substituted in different embodiments to provide a return force. In an embodiment, a thermal assembly can be designed to be in a compressed configuration so that the automated valve is open at low temperatures. In a particular application, FIG. 1 represents Stage 1 configuration corresponding to a temperature, e.g. 80 degrees F., referred to as T1. Stage 1 configuration will be present at any temperature below the melting point of the thermally expansive substance 56. In this example, 80 degrees is selected for illustration purposes. The thermally expansive substance can comprise n-Docosane with a molecular weight of 311 and a melting point of 111.9 degrees F. The thermally expansive substance can comprise n-Tricosane with a molecular weight of 325 and a melting point of 116.6. If the thermal assembly is exposed to fluid at example temperature T1, and the thermally expansive substance 56 comprises n-Tricosane, T1 is below the relevant melting point and the valve will be in the compressed or open configuration. In other embodiments, other paraffins or substances can be selected or mixed to provide the desired temperature response.

Plug 46 can be composed of an elastic material including silicone or rubber or other suitable elastomer. In an embodiment, plug 46 can be made of fluorocarbon elastomer, e.g. Viton brand, 600LF. [Available from DuPont Elastomers.] Plug 46 can be roughly cone shaped to fit within guide 50. The cone shape accentuates the lateral movement of the diaphragm as the larger diameter of the plug is forced into guide 50. Guide 50 has a progressively decreasing internal diameter to force the compression of plug 46 as it is inserted into guide 50. The additional material of the progressively larger conical diameter elongates when entering the restrictive opening of guide 50 to provide increased lateral movement of the piston 42. Plug 46 amplifies the position responsiveness of the piston as the contents of cup 63 expand. In one embodiment, diaphragm 52 displacement of 0.1 inches is translated to 0.15 inches of piston travel through the function of the conical shaped plug 46. Anti-extrusion disk 44 is made of a non-stick material, and in an embodiment, Teflon brand PTFE, and is positioned between plug 46 and piston 42 to prevent deformation of plug 46 at the interface of plug 46 and anti-extrusion disk 44. Piston 42 is positioned within guide 50 and adjacent to anti-extrusion disk 44.

In another embodiment, a thermally expansive mixture can also be employed. Instead of a single substance such as paraffin, the thermally expansive substance 56 can comprise a thermally expansive mixture. In an embodiment the thermally expansive substance comprises a thermally conductive material namely copper powder, a thermally expansive substance such as paraffin, and an elastomer such as Elastol, a viscoelastic polymer available at www.elastol.com. Elastomers, including Elastol, add to the cohesion of the mixture and increasing the workability of the mixture. The melting point of thermally expansive substance 56 corresponds to a set point for the valve.

Figure 2:
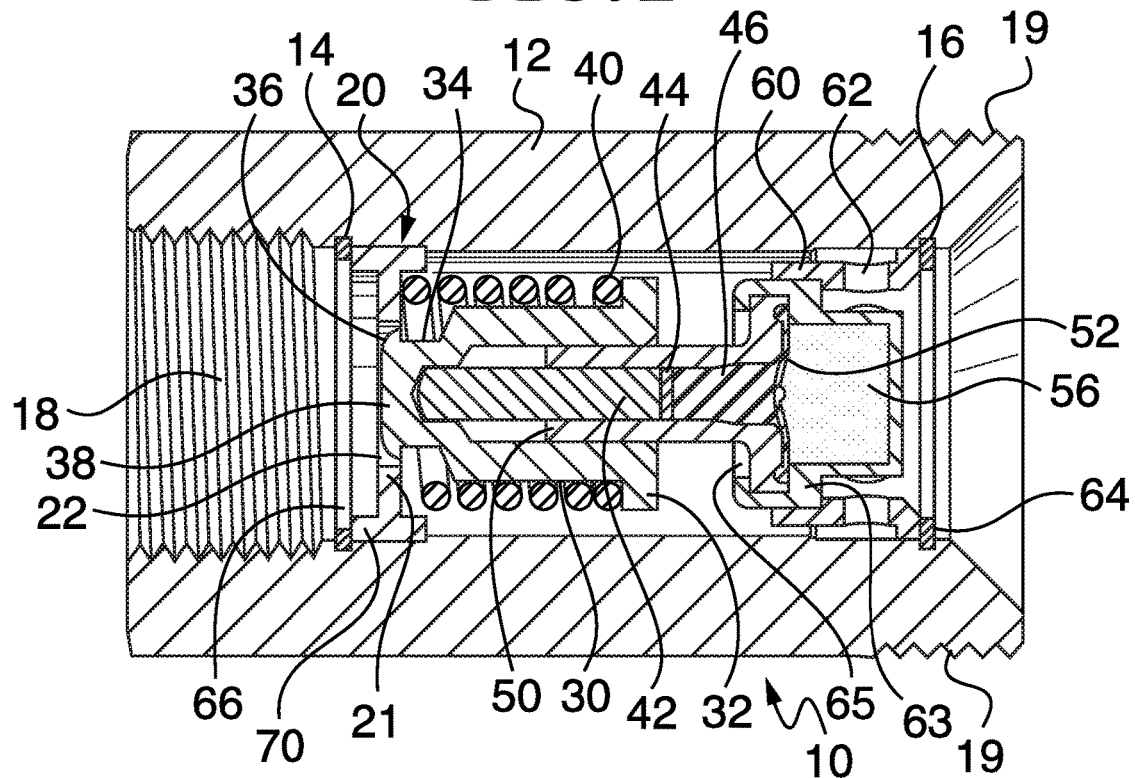
FIG. 2 is a cross section of an automated valve in an intermediate configuration, according to an embodiment.

FIG. 2 is a cross section of an automated valve in an intermediate configuration. Upon heating, thermally expansive substance 56 pushes diaphragm 52 outward and provides movement of piston 42 and piston casing 30 towards seat opening 22. The intermediate expansion of the thermal assembly is shown in FIG. 2. Piston casing end 38 is configured with radial extension 36. The radial extension 36 is configured to be positioned in the seat opening 22 at an intermediate temperature. For clarity this can be referred to as Stage 2 at temperature 2 (T2). In an embodiment, the automated valve can be configured to expand so that at T2, radial extension 36 is positioned within seat opening 22 of seat 20. T2 can be a desired target temperature, for example 120 degrees that represents the presence of sufficiently warm fluid. In a hot water delivery system such as for showers in a residential building, hot water of 120 degrees F. can be selected at the target temperature, or set point, T2. The selection of paraffins among different chain lengths and melting points can be used or blended to provide a thermally expansive substance 56 that achieves automated valve expansion at the desired target temperature. For example, a blend of n-Docosane and n-Tricosane can be used in an embodiment to provide expansion to Stage 2 at T2 of 120 degrees F. As shown in FIG. 2, the automated valve is mostly closed to flow, but not entirely closed as communication flow is permitted between radial extension 36 and seat interface 21. Communication flow through the seat opening 22 provides that the valve is still responsive to the temperature of the fluid flowing through the valve and allows the valve to react to changing temperatures.

Figure 3:
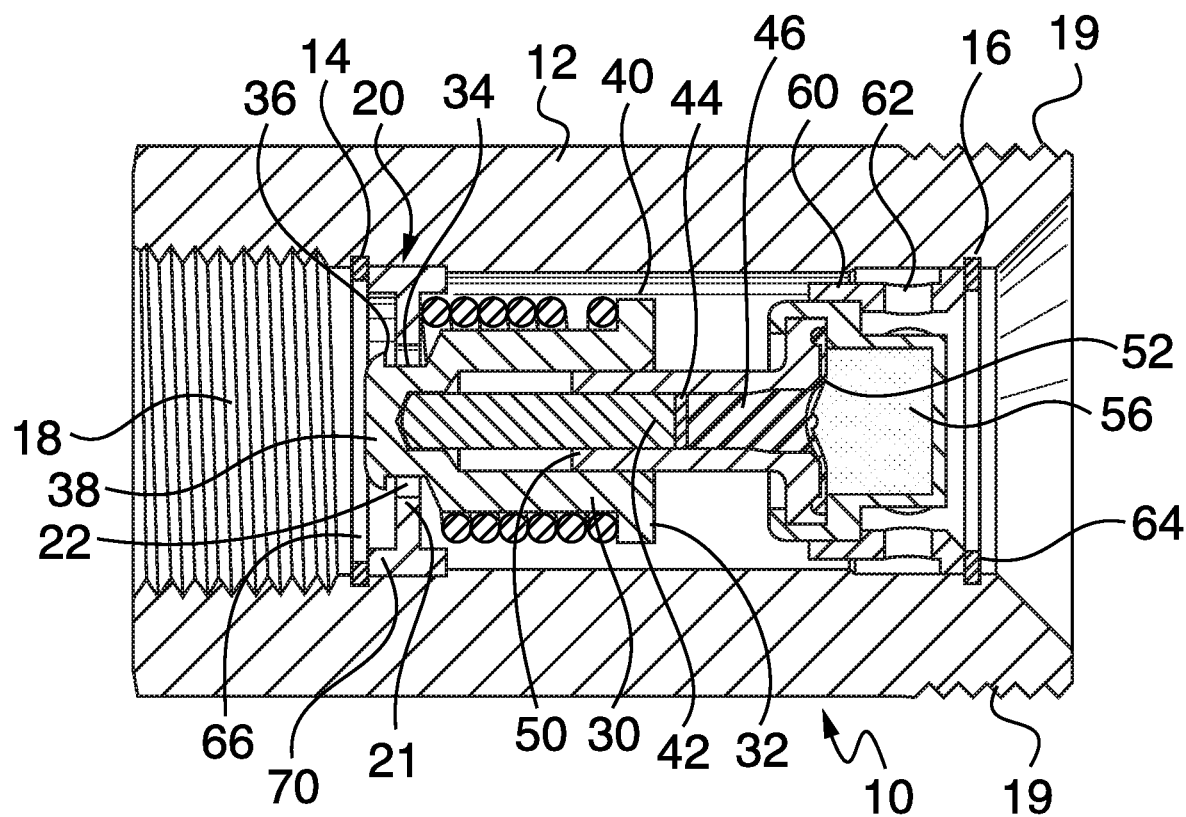
FIG. 3 is a cross section of an automated valve in an expanded configuration, according to an embodiment.

FIG. 3 illustrates the automated valve in an expanded configuration which can be referred to as Stage 3 which is designed to operate at an elevated temperature, set point T3. The multistage valve has many applications, and one application is use in hot water recirculation systems. In order to purge such systems of bacteria, water in excess of 158 degrees F. is delivered to all parts of the system to sanitize the system by killing bacteria. In Stage 2, FIG. 2, the valve is open to communication flow, and a valve in a part of the system near T2 would be in the intermediate configuration. Sanitary flush can be provided by introducing water at elevated temperature T3. While the movement of the piston 42 can be significant during a phase change of the thermally expansive substance 56, further thermal expansion of 56 is experienced with further heating. This relationship is generally linear in relation to temperature change and the change in volume is predicted by the coefficient of thermal expansion times the temperature change. The additional thermal expansion experienced up to T3 causes additional expansion of the thermally expansive substance 56 and causes movement of the piston 42 so that piston casing end 38 moves past seat interface 21. When radial extension 36 is positioned past seat interface 21 as shown in FIG. 3, the automated valve 10 is more open to flow. Piston narrow 34 presents less of an obstruction and occupies less of seat opening 22 allowing for greater flow in Stage 3 than the communication flow in Stage 2, FIG. 2. In this way, hot water flows can be balanced in Stage 2, and sanitary flush can be allowed to flow freely in Stage 3 expanded configuration.

The configuration of the piston casing end 38, the radial extension 36, the piston narrow 34, and the thermally expansive substance 56 can all be configured to program the multistage automated valve to perform different functions at different temperatures. The width of the seat interface 21 can be modified; when thicker, Stage 2 will be active over a longer temperature range; when thinner, Stage 2 will be active over a shorter temperature range. In an embodiment of the invention, seat 20 is removable and can be replaced with a seat configured to provide different functions. In FIGS. 1 through 3, seat interface 21 is positioned in the center of seat base 20 when viewed in cross section. Seat 20 can be shaped so that seat interface 21 is positioned off center so that the seat opening can be closer to piston casing end, or further from piston casing end to provide different performace characteristics. Stage 2 can be provided at a lower temperature by moving the seat interface closer to the piston; a higher temperature can be selected by moving the seat interface away from the piston. The radial extension 36 can be selected to modify the performance of the automated valve. By altering the position and the thickness of the radial extension 36 the temperature responsive performance of the automated valve can be altered and in essence, programmed. A wider radial extension can be employed to engage stage 2 at a lower temperature and cause it to persist over a longer temperature range. Stage 2 can be activated at higher temperatures by positioning the radial extension 36 further from the piston casing end 38, or causing it to persist over a shorter temperature range by providing a radial extension 36 with a smaller width. In this way, the thermally expansive material 56 can be selected to melt and expand at desired temperatures or set points and the seat interface 21 position and width can be selected with radial extension 36 position and width to provide the desired flow control actions by the automated multistage valve. The cross sectional area open to flow at various temperatures determines the flow rate.

Figure 4:
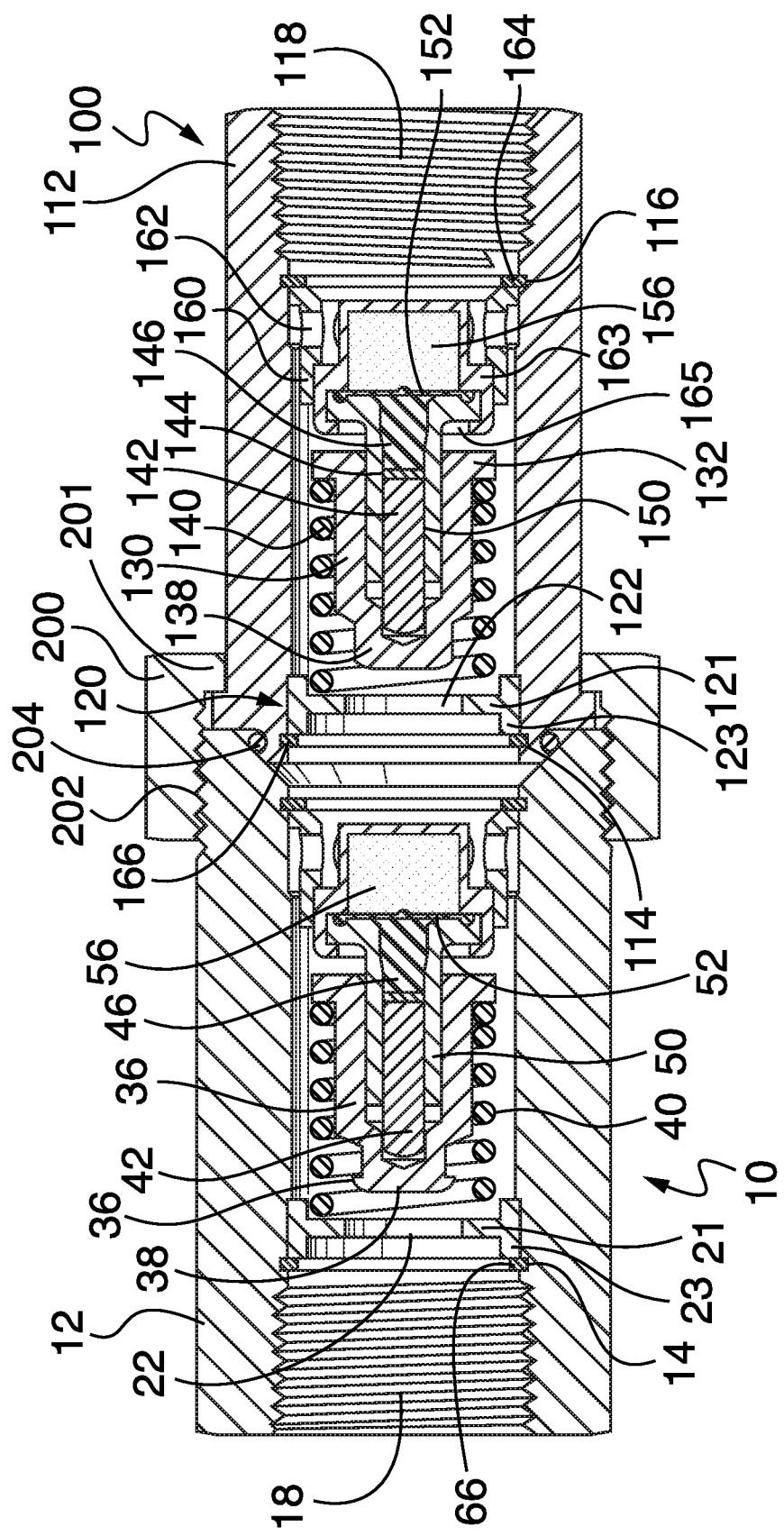
FIG. 4 is a cross section of an automated valve wherein the first valve section and the second valve section are in a compressed configuration, according to an embodiment.

In some applications, it is desirable to provide flow balancing at normal system temperatures and also to provide flow balancing at elevated system temperatures. FIG. 4 provides an automated valve comprising a first thermal assembly and a second thermal assembly. Two thermal assemblies can be inserted into a single casing where the internal diameters are descending from one side, or each side, of the casing to allow for insertion of all components. For convenience of construction, two casings can be employed and then joined as shown in FIG. 4. Utilizing two casings allows a user to select a first thermal assembly and a desired second thermal assembly and combine the two with a connection such as mechanical connection, for example threaded connection.

FIG. 4 is a cross section of an automated valve comprising a first valve section 10 and a second valve section 100. In this embodiment, the first thermal assembly regulates hot water flow, and the second thermal assembly regulates sanitation flow. Both thermal assemblies are shown in a compressed configuration. FIG. 4 presents a four stage automated valve in an embodiment of the invention. Automated valve section 10 can be the same valve as described in FIGS. 1 through 3. Automated balancing valve section 100 provides automated responses at higher temperatures. Seat 120 effects a reduction of cross sectional void within casing 112. Seat 120 can be inserted into casing 112 and held in place by retaining ring 166 disposed in retaining groove 114. Seat 120 comprises seat base 123, seat interface 121, and seat opening 122. Carrier 160 comprising carrier holes 162 is held in place by retaining ring 164 disposed in retaining groove 116. Casing 112 can be threaded, for example interior threads 118. Cup 163 contains thermally expansive substance 156. Guide 150 holds diaphragm 152 in place. Cup lip 165 in turn retains Guide 150. The expansion of thermally expansive substance 156 pushes outward on diaphragm 152 which forces plug 146 into antiextrusion disk 144 to move piston 142 away from cup 164 and overcome spring 140. Spring 140 is positioned between seat interface 121 and piston casing collar 132. Piston 142 moves piston casing 130 to position piston casing end 138 within seat opening 122. Automated balancing valve section 100 can be combined with automated balancing valve section 10 from FIG. 1 to provide the combined multistage automated valve. In an embodiment, casing 12 can be combined with casing 112 with union 200 to provide easier access to each casing and provide interchangeable elements were the functional range of the sanitary flush temperature side provided by valve 100 can be combined with the desired hot water temperature functional range provided by valve 10. Collar 201 engages casing 112 and union threads 202 provide threaded connection to casing 12. O-ring 204 provides additional sealing between the casings. Automated balancing valve 10 is shown in a compressed configuration as described in FIG. 1 and referred to as Stage 1. In this embodiment, T1 causes both sides of the automated valve, both valve sections, to be in a compressed configuration.

Figure 5:
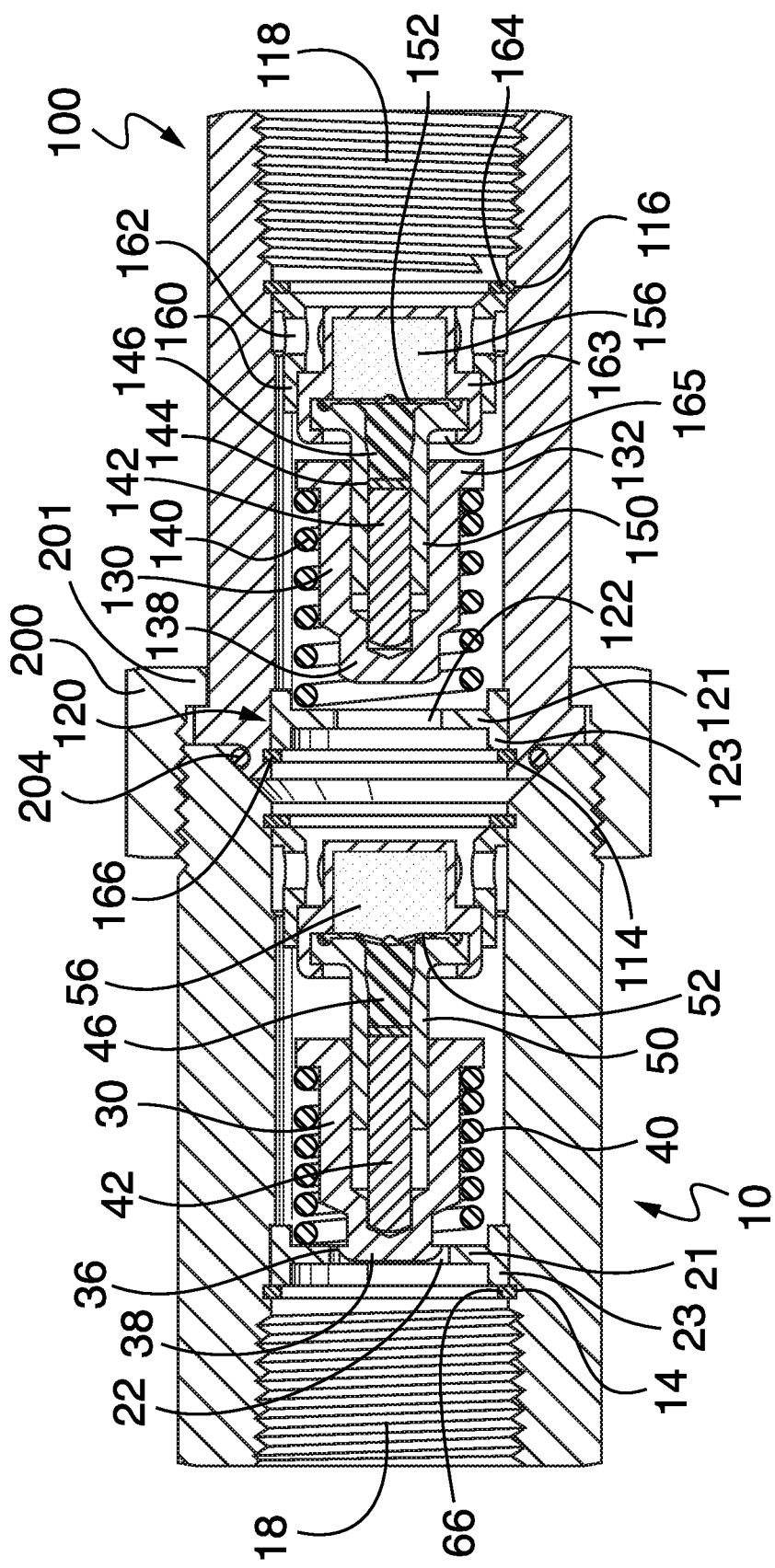
FIG. 5 is a cross section of an automated valve wherein a first valve section is in an intermediate configuration, and a second valve section is in a compressed configuration, according to an embodiment.

FIG. 5 presents a cross section of an automated valve wherein valve section 10 is in an intermediate configuration, and valve section 100 is in a compressed configuration, according to an embodiment. Piston casing end 38 is shown positioned in seat opening 22. This configuration can be referred to as Stage 2 corresponding to T2. T2 is at or near the melting point of the thermally expansive substance 56, for example, 120 degrees F. Radial extension 36 obstructs most of the cross sectional area of seat opening 22. At temperatures near T2, the radial extension reduces flow through the valve to a low flow rate and still allows communication flow. Thermal communication between the fluid and the thermally expansive substance 56 ensures timely responses to temperature changes. When valve section 10 is in this configuration, the piping run where the valve is installed is deemed to be at a sufficiently high temperature for hot water delivery that recirculation flow through that piping run is reduced to communication flow. The low level of flow allows recirculation flow in the overall system to be directed to other parts of the system that may not be at sufficiently high temperature and also reduces the demands on the pumps and parts of the recirculation system.

Figure 6:
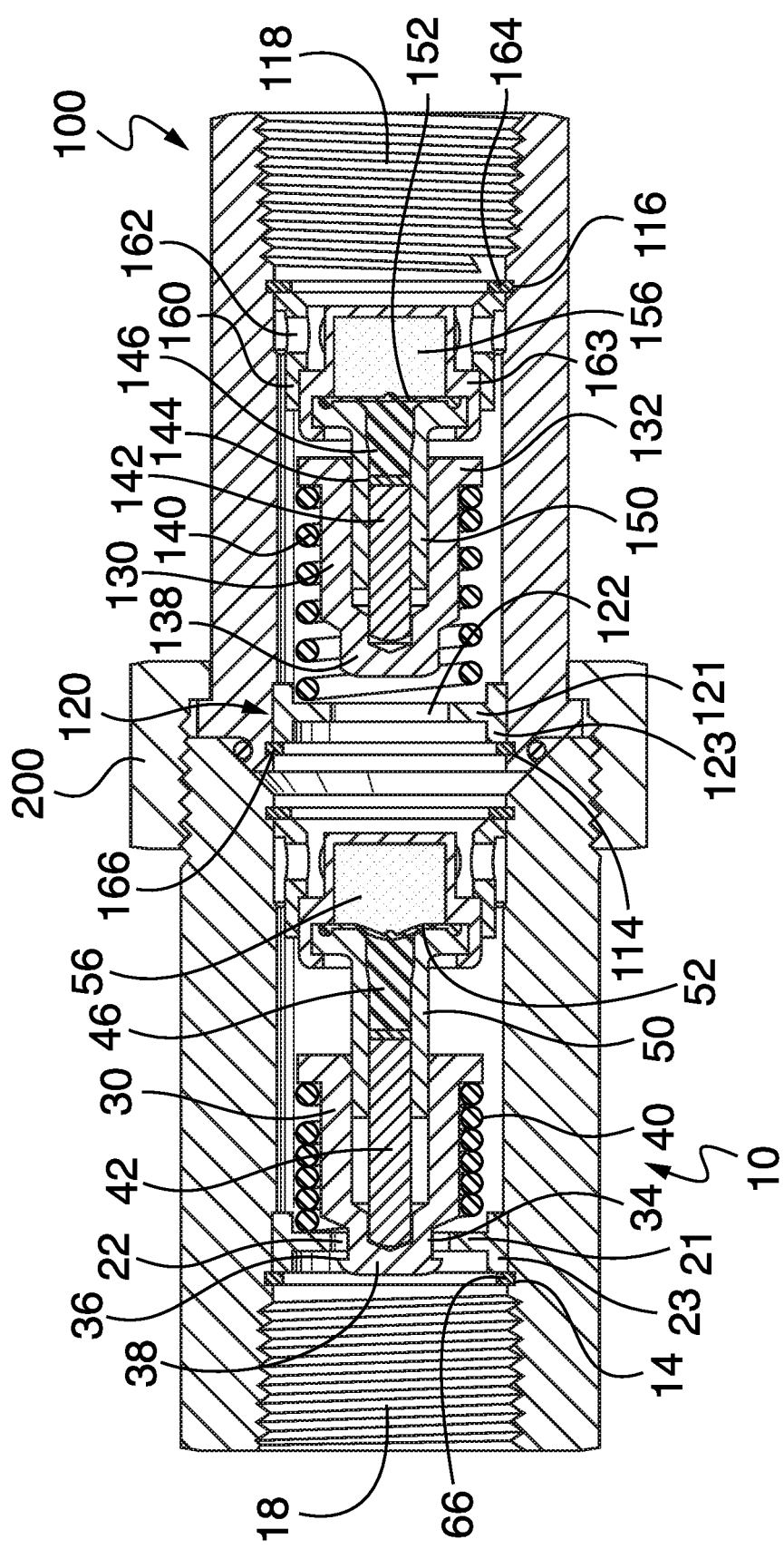
FIG. 6 is a cross section of an automated valve wherein a first valve section is in an expanded configuration, and a second valve section is in a compressed configuration, according to an embodiment.

FIG. 6 presents a cross section of an automated valve wherein valve section 10 is in an expanded configuration, and valve section 100 is in a compressed configuration, according to an embodiment. In this embodiment, valve section 10 is in Stage 3 corresponding to T3. The temperature of fluid in the valve 10 is significantly higher than the normal operating temperature. T3 can be selected based on the desiring operating parameters of the system. For example, T3 at about 150 Degrees F. is 30 degrees higher than exemplary T2 selected to be 120 degrees F. Significant thermal expansion of thermally expansive substance 56 has caused the piston 42 to move further to overcome spring 40 and radial extension 36 is positioned past the seat opening 22. Piston casing narrow 34 is positioned within seat opening 22 allowing for increased flow in Stage 3 relative to Stage 2. In this embodiment, thermally expansive substance 156 has a higher melting point and the thermal assembly remains compressed.

Figure 7:
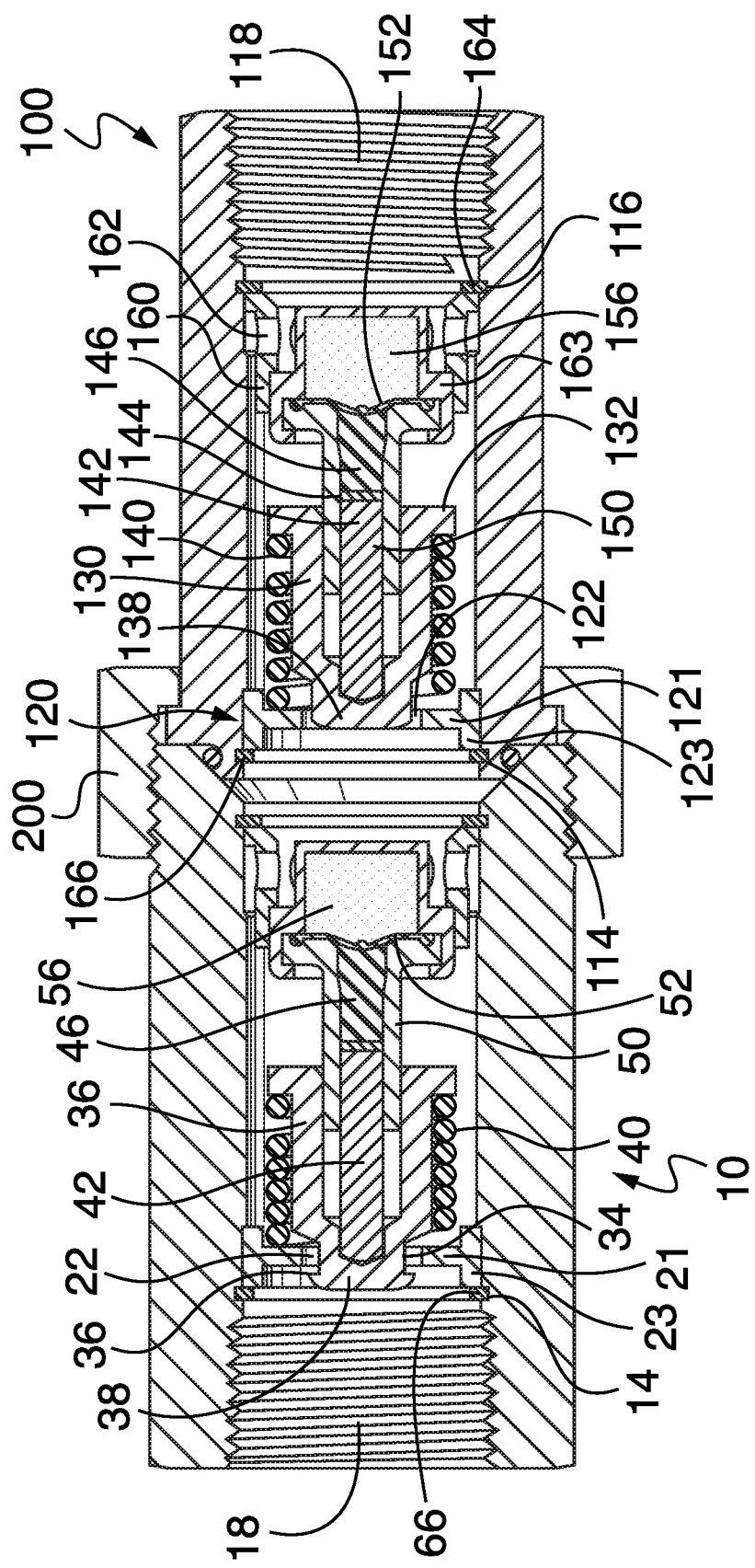
FIG. 7 is a cross section of an automated valve wherein a first valve section is in an expanded configuration, and a second valve section is in an expanded configuration, according to an embodiment.

FIG. 7 presents a cross section of an automated valve wherein valve section 10 is in an expanded configuration, and valve section 100 is in an expanded configuration, according to an embodiment. The embodiment, by nature of the two thermal assemblies presents an additional configuration to balance flow rates during sanitary flush. FIG. 7 represents Stage 4 of a multistage automated valve. At an elevated temperature, for example 170 degrees F. referred to as T4, the thermally expansive substance 156 within cup 163 can melt and expand to force diaphragm 152 into plug 146 and the thermal assembly acts to move the piston casing 130 towards seat 120. Polyethylene wax such as commercially available Astorstat 8510A can be utilized as thermally expansive substance 156 that moves the valve to Stage 4 at approximately 170 degrees F. In this way, when sanitary flush temperature fluid is detected to be sufficiently present, the automated balancing valve moves to an expanded configuration shown in FIG. 7. Stage 4 corresponds to a communication flow rate through the valve determined by the cross sectional area available between seat 120 and piston casing end 138. The amount of seat opening 122 available to flow determines the flow through the multistage automated valve.

As can be appreciated, different geometries of the piston casing end and the seat can be combined in valve section 10 and valve section 100 to provide different operating characteristics. Additionally, thermally expansive substance 56 and thermally expansive substance 156 can be selected to perform at different temperatures. Stage 1, for example will persist until the melting point of thermally expansive substance 56 is reached. In the particular embodiment presented in FIGS. 4 through 7, Stage 1 in FIG. 4 corresponds to cold temperatures where recirculation flow is desired to reach hot water delivery temperatures. Stage 2 in FIG. 5 will be triggered by the arrival of hot water where thermally expansive substance 56 is selected with a melting point near the desired hot water delivery temperature, e.g. T2 set point of about 120 degrees F. FIG. 6 represents Stage 3 where sanitary flush has been initiated. In these operations, the hot water boiler or hot water heater is altered to produce water that is much hotter than usual, and is scalding temperature. Sinks and showers, for example, will need to be made off limits to users to avoid scalding. T3 can be, for example a set point of 150 degrees F. that causes additional expansion of thermally expansive substance 56. The geometry of piston casing 36 can be selected to provide different flow rates at Stage 3 than at Stage 2. In the embodiment shown in FIG. 6, piston casing narrow 36 provides increased flow rate in Stage 3 through reduced obstruction of seat opening 22. In other embodiments, piston casing 36 can be shaped with a different profile to provide a greater or lesser increase of flow.

Figure 8:
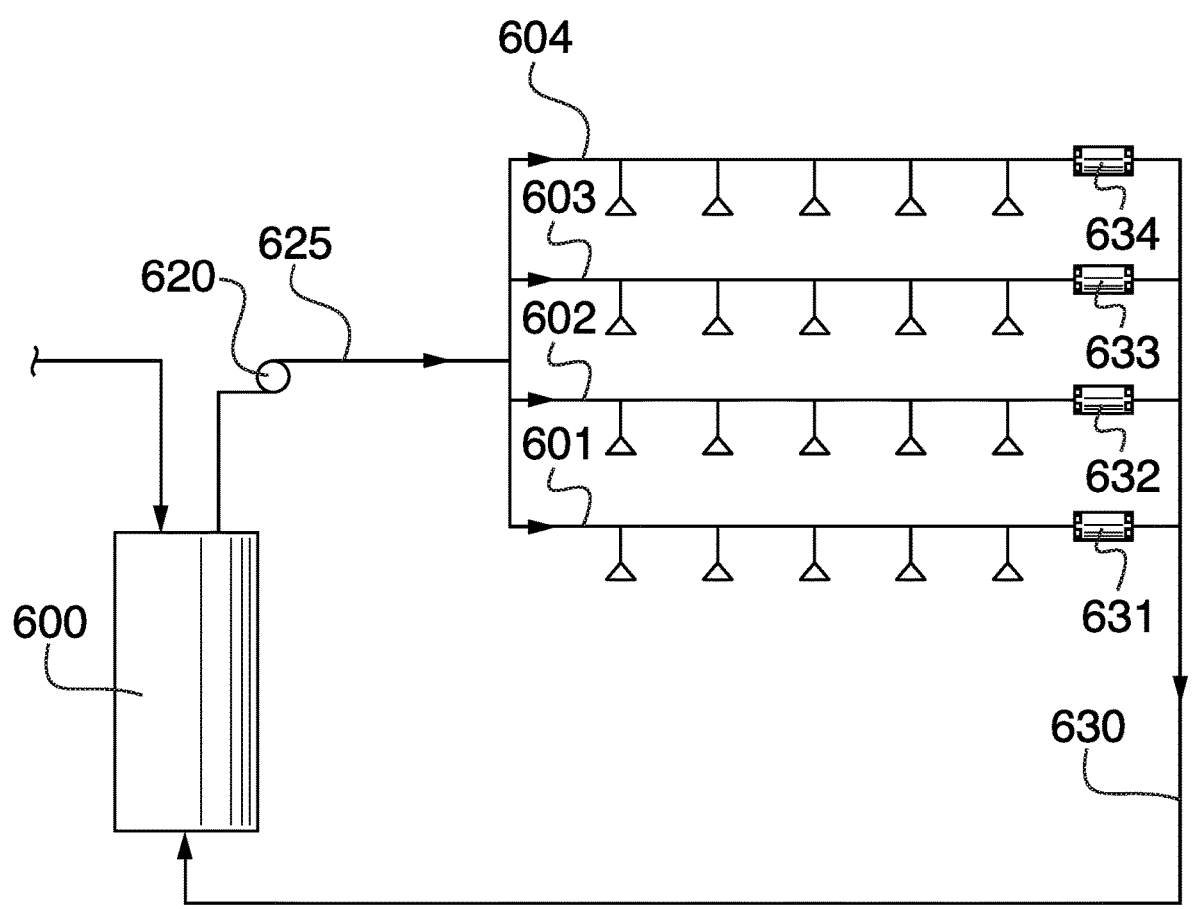
FIG. 8 is a schematic drawing of a piping system, according to an embodiment.

FIG. 8 presents a schematic of a piping system. The configuration of the automated valve within a piping system is shown. The schematic in FIG. 6 represents a hypothetical four story building, however, any piping system size or configuration is contemplated by the invention. Hot water heater 600 is connected to pump 620 through any conventional means including piping. Pipe 625 is connected to four different branches 601, 602, 603, and 604 representing the four stories of a building. Each floor contains multiple shower heads for illustration. The multiple fixtures are connected as the piping system is united in one return pipe 630 that returns unused, recirculated hot water to the hot water heater 600. At the end of branch 601, automated valve 631 is installed in line. At the end of branch 602, automated valve 632 is installed in line. At the end of branch 603, automated valve 633 is installed in line. "Automated valve" can refer to the automated valve in FIG. 1, or the embodiment shown in FIG. 4, or another embodiment with the scope of the invention. The method utilizing automated valve embodiment of FIG. 1 will be described first. At the end of branch 604, automated valve 634 is installed in line. Each valve is configured so that it will be substantially open to the flow of water when below a set point or "cold" corresponding to Stage 1. In this way, the pressure created by pump 620 will cause water to flow through the associated branch of the piping system that contains an automated valve in a "cold" or substantially open position. The automated valve will warm up upon the arrival of hot water and will substantially close, corresponding to Stage 2. This will prevent large amounts of water being recirculated through the branch of the piping system that contains the substantially closed automated valve. Thus, if pipe runs 601, 602, and 603 are sufficiently warm, automated valves 631, 632, and 633 will be substantially closed, limiting the recirculation flow to communication flow through the respective portions of the piping system. If the top floor represented by pipe run 604 is receiving insufficient hot water flow, automated valve 634 will be at a temperature below the set point of T2 and cause the automated valve to open to Stage 1 to effect the flow of hot water through pipe run 604, or the fourth floor of the building. At the point where recirculated hot water flow in pipe run 604 is sufficiently warm (at T2) to cause the automated valve to close to Stage 2, recirculated water in pipe run 604 is substantially reduced to communication flow. When sanitary flush operations are initiated, hot water heater 600 is used to produce elevated temperature water to sanitize the piping system. Water of, for example, 180 degrees F. can be introduced to pipe 625. As the automated valves are open to at least communication flow, the sanitizing temperature water will make its way through the system to the valve, for example automated valve 633. The elevated temperature at or above T3 will cause the valve to move to Stage 3 and provide increased flow rate to allow sanitary flush to move through the system. These movements automatically occur within the valve based on temperature of fluid flow. In this way, the valve is automated and operates continuously, dynamically, and without the need for user intervention.

Where the embodiment of the automated valve utilized in the method of FIG. 6 is the multistage balancing valve of FIG. 4, an additional Stage 4 is provided to balance the flows in the system during sanitary flush operations. When sanitary flush temperature of for example 170 degrees F. reaches cup 163 and causes thermally expansive substance 156 to melt, the automated valve expands to the configuration shown in FIG. 7. The movement of piston casing end 138 into seat opening 122 reduces flow through the valve for example valve 632 to communication flow. The flow through pipe 602 is reduced. If the fixtures in pipe 602 are not in use, flow through pipe 602 is limited to the communication flow through automated valve 632. This balancing helps ensure that sanitary flush temperature water is received at all parts of the piping system to ensure the elimination of bacteria or harmful organisms. Recirculation flow rates are limited where the T4 is met, and recirculation flow rates are maximized in piping runs where lower temperature fluids (e.g. less than T4) are present.

FIG. 9 presents a cross section view of a multistage automated valve comprising a check valve, in an embodiment of the invention. Valve section 10 can be combined with valve section 300 where valve section 10 can be similar to previous Figures. Casing 312 can be elongated to house additional elements such as retaining groove 306 and retaining ring 305 which serve to retain housing 304. Seat 303 is sealed with O-ring 310 and plunger 330 seals against O-ring 320. Check valve guide 332 centers plunger 330 within the valve and base 301 abuts seat 120 to maintain position. Groove 302 helps maintain the position of valve seat 303. Seat interface 121 is met by spring 140 and the similarly numbered elements of FIG. 9 can be the same as elements in exemplary FIG. 6. Piston 42 and Piston 142 are driven by thermal expansion, and the check valve plunger ensures that flow is allowed from left to right in the drawing and flow is prevented from right to left as shown in the embodiment. It will be appreciated that reversing the orientation of the check valve components, or reversing the entire device of FIG. 9 will result in flow being allowed in the reverse direction.

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A multistage automated valve comprising:
   a casing providing flow between a first end and second end and having a casing interior;
   a seat disposed within said casing interior and comprising a seat interface and a seat opening;
   a piston casing disposed within said casing interior and said piston casing comprises a piston casing end and a radial extension configured for insertion travel into said seat opening;
   a thermally expansive substance configured to move said piston casing in a first axial direction to position said radial extension within said seat opening when said thermally expansive substance is heated above a first set point, wherein said radial extension has a diameter less than said seat opening to allow for communication flow between said radial extension and said seat interface;
   said piston casing further comprises a piston casing narrow and said thermally expansive substance is configured to move said piston casing further in said first axial direction to position said piston casing narrow within said seat opening when said thermally expansive substance is heated above a second set point, wherein said piston casing narrow has a diameter less than said diameter of said radial extension;
   a spring positioned between said seat and said piston casing to provide a return force to move said piston casing narrow opposite said first axial direction and out of said seat opening when said thermally expansive substance is cooled below said second set point and move said radial extension further opposite said first axial direction and out of said seat opening when said thermally expansive substance is cooled below said first set point.

2. The automated valve of claim 1 wherein said casing is cylindrical and allows flow only from said first end to said second end.

3. The automated valve of claim 1 wherein said seat is removable from said casing.

4. The automated valve of claim 3 wherein said radial extension is disposed on said piston casing end.

5. The automated valve of claim 3 wherein said thermally expansive substance is disposed in a cup.

6. The automated valve of claim 5 further comprising:
   a diaphragm positioned between said thermally expansive substance and a conical plug;
   a piston; and
   a guide, wherein said conical plug and said piston are disposed within said guide, and said guide is disposed within said piston casing.

7. The automated valve of claim 6 wherein said thermal assembly further comprises an antiextrusion disk between said conical plug and said piston.

8. The automated valve of claim 1 further comprising:
   a second seat disposed within said casing and comprising a second seat interface and a second seat opening;

a second piston casing disposed within said casing wherein said second piston casing comprises a second piston casing end configured for insertion travel into said second seat opening;

a second thermally expansive substance configured to move a second expansion means to position said second piston casing end within said second seat opening when said second thermally expansive substance is heated above a third set point, wherein said second piston casing end has a diameter less than said second seat opening to allow for communication flow between said second piston casing end and said second seat interface;

a second spring positioned between said second seat and said second piston casing to move said second piston casing out of said second seat opening when said second thermally expansive substance is cooled below said third set point.

9. The automated valve of claim 8 wherein said seat and said second seat are removable from said valve.

10. The automated valve of claim 8 wherein said expansion means comprises a first thermal assembly disposed in a first valve section, and said second expansion means comprises a second thermal assembly disposed within a second valve section, and said first valve section and said second valve section are threadedly connected by a union.

11. The automated valve of claim 10 wherein said second valve section further comprises a check valve to allow flow from said first valve section to said second valve section and prevent flow from said second valve section to said first valve section.

12. A method of distributing fluids, comprising:

providing a hot water piping system comprising a hot water supply line supplying hot water to a plurality of hot water piping runs, each of said hot water piping runs comprising at least one plumbing fixture configured to supply hot water to a user, and each of said hot water piping runs discharging into a common return pipe;

inserting a first automated valve according to claim 1 at an end of a first hot water piping run at a location downstream of a first plumbing fixture and upstream of said common return pipe;

inserting a second automated valve according to claim 1 at an end of a second hot water piping run at a location downstream of a second plumbing fixture and upstream of said common return pipe;

determining by said first automated valve a first fluid temperature interior to said first automated valve, and permitting flow through said first automated valve when said first fluid temperature is below said first set point, and automatically reducing cross sectional area available to flow through said first automated valve when said first fluid temperature is above said first set point; and determining by said second automated valve a second fluid temperature interior to said second automated valve, and permitting flow through said second automated valve when said second fluid temperature is below said first set point, and automatically reducing cross sectional area available to flow through said second automated valve when said second fluid temperature is above said first set point.

13. A method of distributing fluids, comprising:

providing a hot water piping system comprising a hot water supply line supplying hot water to a plurality of hot water piping runs, each of said hot water piping runs comprising at least one plumbing fixture configured to supply hot water to a user, and each of said hot water piping runs discharging into a common return pipe;

inserting a first automated valve according to claim 8 at an end of a first hot water piping run at a location downstream of a first plumbing fixture and upstream of said common return pipe;

inserting a second automated valve according to claim 8 at an end of a second hot water piping run at a location downstream of a second plumbing fixture and upstream of said common return pipe;

determining by said first automated valve a first fluid temperature interior to said first automated valve, and permitting flow through said first automated valve when said first fluid temperature is below said first set point, and automatically reducing cross sectional area available to flow through said first automated valve when said first fluid temperature is above said first set point; and determining by said second automated valve a second fluid temperature interior to said second automated valve, and permitting flow through said second automated valve when said second fluid temperature is below said first set point, and automatically reducing cross sectional area available to flow through said second automated valve when said second fluid temperature is above said first set point.

14. The method of claim 13 further comprising the step of:
automatically increasing cross sectional area available to flow through said first automated valve when said first fluid temperature is above said second set point.

15. The method of claim 14 further comprising the step of:
Automatically reducing cross sectional area available to flow through said first automated valve when said first fluid temperature is above said third set point.

* * * * *